United States Patent [19]
Ushiyama

[11] Patent Number: 4,740,691
[45] Date of Patent: Apr. 26, 1988

[54] OPTICAL ROTARY ENCODER AND METHOD OF ASSEMBLING THE SAME

[75] Inventor: Shigeyuki Ushiyama, Hino, Japan

[73] Assignee: Fanuc Ltd., Yamanashi, Japan

[21] Appl. No.: 855,309

[22] PCT Filed: Aug. 16, 1985

[86] PCT No.: PCT/JP85/00457

§ 371 Date: Apr. 3, 1986

§ 102(e) Date: Apr. 3, 1986

[87] PCT Pub. No.: WO86/01289

PCT Pub. Date: Feb. 27, 1986

[30] Foreign Application Priority Data

Aug. 16, 1984 [JP] Japan ................................. 59-170044

[51] Int. Cl.⁴ .............................................. G01D 5/34
[52] U.S. Cl. ........................... 250/231 SE; 250/237 G
[58] Field of Search ............. 250/239, 231 SE, 237 G; 356/395; 340/347 P; 33/125 C

[56] References Cited

U.S. PATENT DOCUMENTS

| | | | |
|---|---|---|---|
| 4,184,071 | 1/1980 | Fryer et al. ...................... | 250/237 G |
| 4,345,149 | 8/1982 | Blaser .............................. | 250/231 SE |
| 4,375,592 | 3/1983 | Cox et al. ........................ | 250/231 SE |
| 4,512,184 | 4/1985 | Ernst et al. ..................... | 250/231 SE |
| 4,644,158 | 2/1987 | Taillebois .......................... | 250/239 |

Primary Examiner—David C. Nelms
Attorney, Agent, or Firm—Armstrong, Nikaido, Marmelstein & Kubovcik

[57] ABSTRACT

Disclosed is an optical rotary encoder having a fixing base having a cylinder concentric with the axis of a rotating shaft and adapted to be fixed to a flange surrounding the shaft. The encoder includes a light receiving element plate having a hole of a size to be engaged with the cylinder of the fixing base and be rotatable relative thereto during assembly and a light receiving element precisely aligned from the center of the hole in the radial direction thereof, and a fixed encoding plate, in which an encoding portion is formed so that an emitted light is radiated on the light receiving element of the light receiving element plate. The plate is fixed to the fixing base so as to be adjacent to the light receiving element plate at a predetermined distance therefrom.

Also disclosed is a method for assembling the optical rotary encoder.

3 Claims, 4 Drawing Sheets

Fig. 2A (PRIOR ART)  Fig. 2B (PRIOR ART)
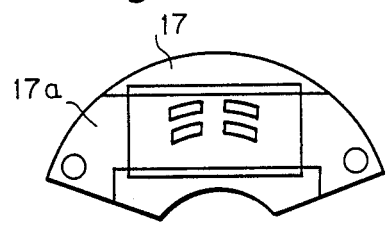 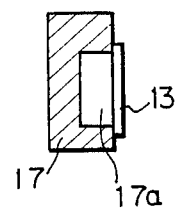
Fig. 2C (PRIOR ART)  Fig. 2D (PRIOR ART)
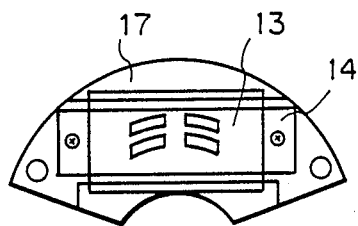 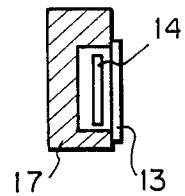
Fig. 2E (PRIOR ART)  Fig. 2F (PRIOR ART)
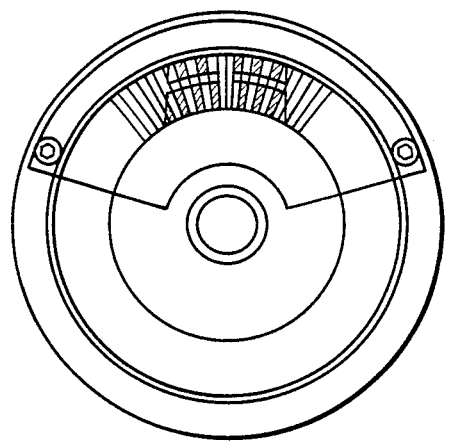 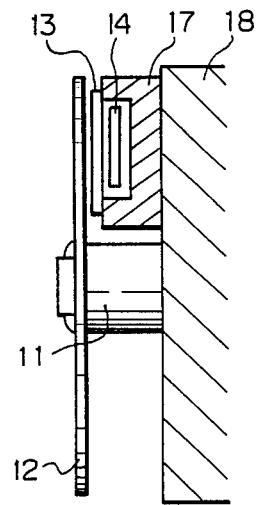

OPTICAL ROTARY ENCODER AND METHOD OF ASSEMBLING THE SAME

DESCRIPTION

1. Technical Field

The present invention relates to an optical rotary encoder and, more particularly, to an optical rotary encoder which allows easy alignment to a light receiving element and a fixed slit.

2. Background Art

An optical rotary encoder is already known. FIGS. 1(A) to 1(D) show an example of such an optical rotary encoder. FIG. 1(A) is a partial cutaway view, in which a fixed encoding plate 13 is fixed to a lower portion of a rotating encoding disk 12 fixed to a rotating shaft 11, and a light receiving element array 14 is fixed below the plate 13. A light emitting diode 15 fixed to a printed circuit board 16 is arranged above the rotating encoding disk 12. FIG. 1(B) is a plan view of the rotating encoding disk. Light-transmitting portions (slits) and light-shielding portions (indicated by hatched portions) are formed along the outer periphery of the rotating encoding disk 12 at equal intervals. Light emitting diodes 15a and 15b (in FIG. 1(A), generally indicated by reference numeral 15), emit light downward onto the light-transmitting and light-shielding portions. FIGS. 1(C) and 1(D) are plan views showing the fixed encoding plate 13 and the light receiving element array 14. The fixed encoding plate 13 derives an A-phase signal and an $\overline{A}$-phase signal (the inverted signal thereof), and a B-phase signal and $\overline{B}$-phase signal (the inverted signal thereof), which have a 90° phase difference from the A- and $\overline{A}$-phase signals, respectively. Note that the patterns of the fixed encoding plate and the light receiving element array must completely overlap each other. In addition, the pattern of the fixed encoding plate 13 and that of the light-transmitting and light-shielding portions of the rotating encoding disk 12 must be completely concentric with each other.

For this reason, in the conventional encoder, the assembly and alignment are performed as shown in Figs. 2(A) to 2(F). Note that FIGS. 2(A), 2(C), and 2(E) are partial plan views of the encoder shown in FIGS. 1(A) to 1(D), and FIGS. 2(B), 2(D), and 2(F) are sectional views corresponding to those plan views.

Referring to FIGS. 2(A) and 2(B), the fixed encoding plate 13 is mounted on a fixing base 17 having a groove 17a. Next, referring to FIGS. 2(C) and 2(D), the light receiving element array 14 is inserted in the groove 17a, and is mounted on the fixing base 17. In this case, the patterns of the fixed encoding plate and the light receiving element array are aligned accurately using a microscope. Referring to FIGS. 2(E) and 2(F), the fixing base 17 is mounted on a flange 18, the patterns of the rotating encoding disk 12 and the fixed encoding plate 13 are aligned to be concentric with each other, and then the fixing base 17 is fixed to the flange 18 by screws.

Since the above components must be moved in X and Y directions, i.e., two directions, so as to be aligned, alignment of the light receiving element array and the fixed encoding plate, and that of the fixing base and the flange are cumbersome and the number of assembling steps of the encoder is undesirably increased.

DISCLOSURE OF INVENTION

It is an object of the present invention to provide an encoder which allows easy alignment of an encoder, and reduces the number of assembling steps.

According to the present invention, there is provided an optical rotary encoder for detecting a rotating position of a rotating shaft by exposing and obscuring an optical path formed between a light emitting element and an opposing light receiving element upon rotation of the rotating shaft, characterized by comprising: a fixing base having a cylinder concentric with an axis of the rotating shaft, and fixed to a flange; a light receiving element plate having a hole of a proper size to be engaged with the cylinder of the fixing base and be rotatable relative thereto during assembly, and a light receiving element precisely aligned from the center of the hole in the radial direction thereof; and a fixed encoding plate, in which an encoding portion is formed so that emitted light is radiated on the light receiving element of the light receiving element plate, which is fixed to the fixing base so as to be adjacent to the light receiving element plate at a predetermined distance therefrom.

When the light receiving element plate with the above arrangement is engaged with the cylinder of the fixing base, the light receiving element is precisely aligned with the axis in the radial direction. Furthermore, when the fixed encoding plate is fixed to the fixing base and the light receiving element plate is rotated to be adjusted in its circumferential direction, the encoding portion of the fixed encoding plate can be easily aligned with the light receiving element of the light receiving element plate, and after this alignment, the fixed encoding plate and the light receiving element plate are fixed to the fixing base. The fixing base with the thus aligned fixed encoding plate and light receiving element plate is fixed to the flange as described above with respect to FIGS. 2(E) and 2(F).

The fixed encoding plate is fixed to the fixing base so as to be aligned with the encoding portion of the rotating encoding disk using a light-transmitting ring formed in the fixed encoding plate.

Furthermore, according to the present invention, there is provided a method for assembling an optical rotary encoder which detects a rotating position of a rotating shaft by exposing and obscuring an optical path formed between a light emitting element and an opposing light receiving element upon rotation of the rotating shaft, and which comprises: a fixing base having a cylinder concentric with an axis of the rotating shaft, and fixed to a flange; a light receiving element plate having a hole of a proper size to be engaged with the cylinder of the fixing base and be rotatable relative therein during assembly, and a light receiving element precisely aligned from the center of the hole in the radial direction thereof; and a fixed encoding plate, in which an encoding portion is formed so that given light is radiated on the light receiving element of the light receiving element plate, which is fixed to the fixing base so as to be adjacent to the light receiving element plate at a predetermined distance therefrom, characterized by comprising: (a) the step of fitting a cylindrical step of the fixing base in the hole of the light receiving element plate; (b) the step of aligning the fixed encoding plate with a supporting portion of the fixing base; (c) the step of centering the fixed encoding plate; (d) the step of rotating the light receiving element plate so as to align the light receiving element with the fixed encoding plate while the light receiving element plate is kept inserted in the cylindrical step of the fixing base; (e) fixing the light receiving element plate and the fixed encoding plate to the fixing base; and (f) engaging the fixing base with the fixed encoding plate and light receiving element plate, which are aligned and fixed in the above steps, with an engaging portion of the flange.

BRIEF DESCRIPTION OF DRAWINGS

FIGS. 1(A) to 1(D) partially show a conventional optical rotary encoder, in which FIG. 1(A) is a sectional view, FIG. 1(B) is a plan view of a rotating encoding disk, FIG. 1(C) is a plan view of a fixed encoding plate, and FIG. 1(D) is a plan view of a light receiving element array;

FIGS. 2(A), 2(B), 2(C), 2(D), 2(E) and 2(F) are views showing assembly and alignment of the light receiving element array and the rotating encoding disk in FIG. 1;

FIGS. 3(A) to 3(D) partially show an increment type optical rotary encoder according to the present invention, in which FIG. 3(A) is a sectional view, FIG. 3(B) in a plan view, FIG. 3(C) is a plan view viewed from a plane H—H' of FIG. 3(A), and FIG. 3(D) is a sectional view; and FIGS. 4(A) to 4(C) partially show an absolute type optical rotary encoder according to the present invention, in which FIG. 4(A) is a plan view of a rotating encoding disks FIG. 4(B) is a plan view corresponding to FIG. 3(B) and FIG. 4(C) is a plan view corresponding to FIG. 3(C).

BEST MODE OF CARRYING OUT THE INVENTION

Figure 1A:
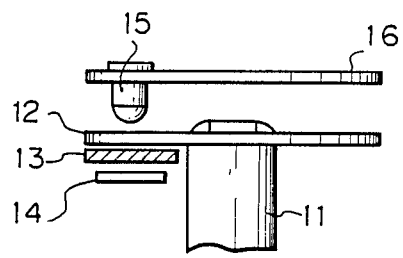
Figure 1B:
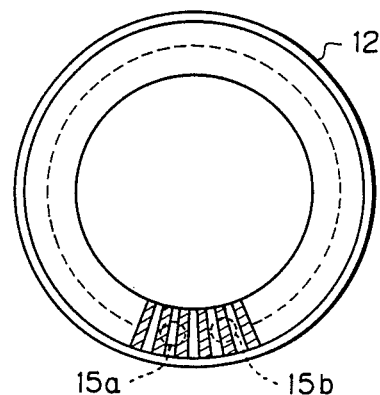
Figure 1C:
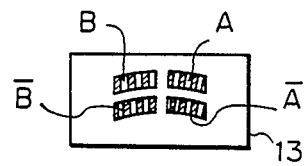
Figure 1D:
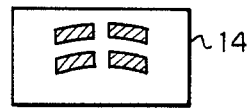

FIG. 3 shows assembly of an optical rotary encoder according to an embodiment of the present invention. FIG. 3(A) is a sectional view of a light receiving element plate 24 and a fixed encoding plate 23 mounted on a fixing base 27. FIG. 3(A) shows a state when the fixed encoding plate 23 is fixed using a jig 40, a non-metallic spacer 41, a washer 42, and a screw 43. FIG. 3(B) is a plan view of FIG. 3(A). The fixed encoding plate 23 is circular in shape, as shown, and has the same pattern for deriving A-, $\overline{\text{A}}$-, B-, and $\overline{\text{B}}$-phase signals as that in FIG. 1(C). The encoding plate 23 made of glass is covered with a black mask indicated by hatching excluding the pattern portions and a light-transmitting ring 23a. As will be described later, the light-transmitting ring 23a is used as a centering track. FIG. 3(C) is a plan view viewed in a plane H—H' of FIG. 3(A). FIG. 3(D) is a sectional view of FIG. 3(C). The same light receiving element array as shown in FIG. 1(D) is arranged on the light receiving element plate 24 in the radial direction thereto, and is accurately aligned from the center of the rotating shaft in the radial direction. The light receiving element plate 24 comprises a glass-epoxy or ceramic plate having a hole engaged with a step 27b of a cylindrical portion of the fixing base 27.

In assembly of the encoder according to the present invention, the above components are prepared in advance, which must satisfy the following machining conditions. The cylindrical step 27b of the fixing base 27, with which the light receiving element plate 24 is engaged, must be formed in a precisely concentric circle with respect to the center O—O' of the rotating shaft. In this case, however, the step 27b can be easily formed by cylindrical machining using a lathe or the like. The hole of the light receiving element plate 24 is machined to be engaged with the outer diameter of the cylindrical step 27b of the fixing base 27. In this case, a clearance of several micrometers must be formed to allow pivotal movement of the light receiving element plate 24 when it is inserted into the cylindrical step 27b of the fixing base. However, the radial position of the light receiving element array with respect to the central axis O—O' must not be adversely influenced. More specifically, this allows easy alignment of the radial position of the light receiving element array with high precision by simply engaging the light receiving element plate with the cylindrical step 27b of the fixing base.

Since the fixed encoding plate 23 is made of glass, machining precision of the hole is limited to at most about 0.1 mm. However, the ring-shaped transparent portion 23a acting as the centering track is formed to be accurately concentric with the axial center.

A method of assembling the encoder shown in FIG. 3 will now be described.

Figure 3A:
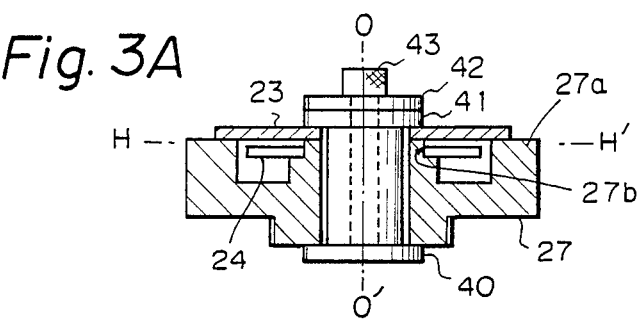
Figure 3B:
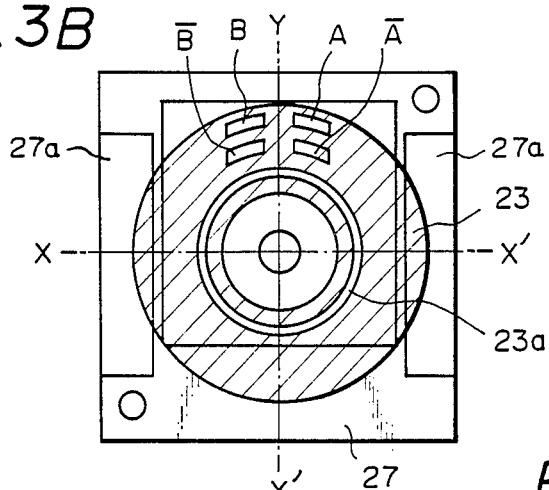
Figure 3C:
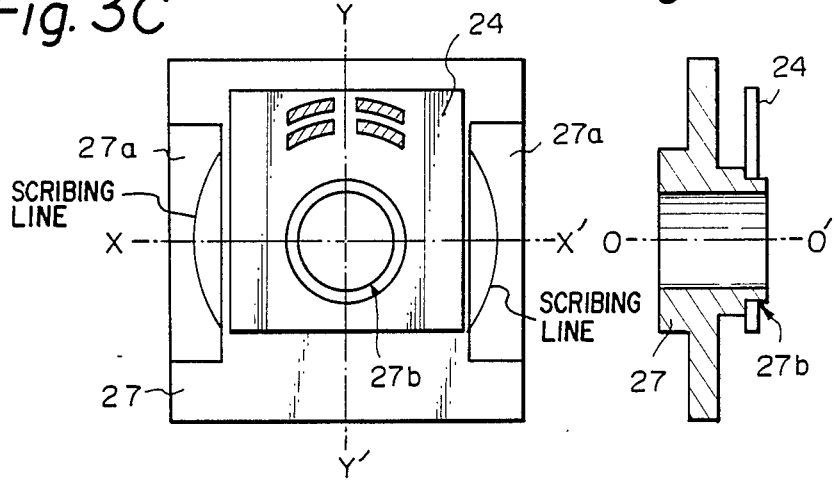
Figure 3D:
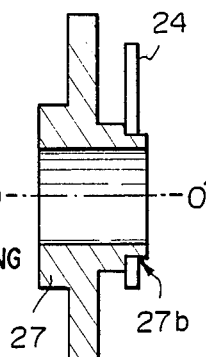

(a) The cylindrical step 27b of the fixing base 27 is fitted into the hole of the light receiving element plate 24 (FIGS. 3(C) and 3(D)).

(b) The fixed encoding plate 23 is placed on the supporting portion 27a of the fixing base 27, and they are visually aligned by the naked eye by using a scribing line formed on the supporting portion 27a of fixing base 27 as shown in FIG. 3(C). Thereafter, the fixed encoding plate 23 is temporarily fixed to the fixing base 27 using the spacer 41, the washer 42, the screw 43, and the like (FIGS. 3(A) and 3(B)).

(c) Next, the center of the fixed encoding plate 23 is determined using the centering jig. If the track is eccentric with the center, the radial position of the fixed encoding plate is aligned by, e.g., tapping while visually observing the light-transmitting ring 23a of the fixed encoding plate with a microscope.

(d) The light receiving element plate 24 is rotated in the circumferential direction while it is kept on the cylindrical step 27b of the fixing base 27 and is aligned so that a window of the light receiving element is located immediately below the slit of the fixed encoding plate 23.

(e) The light receiving element plate 24 is fixed so as not to allow it to rotate any more, the fixed encoding plate 23 is fixed to the fixing base 27, and the jig and the like are removed.

(f) After alignment of the pattern of the fixed encoding plate 23 and the light receiving element array of the light received element plate is completed as above, the fixing base 27 with the fixed encoding plate and the light receiving element plate is fitted in the engaging portion of the flange.

(g) Thereafter, the rotating encoding disk is mounted on the rotating shaft, and gap adjustment and centering are performed in the same manner as in the conventional assembling method.

As is clearly understood from the above descriptions, when the light receiving element plate is mounted on the fixing base, the light receiving element array can be accurately, uniformly, and quickly aligned in the radial direction. Thus, alignment of the pattern of the fixed encoding plate and the light receiving element array need only be performed in the circumferential (rotating) direction. The fixed encoding plate is aligned with the slit portion of the rotating encoding disk when it is mounted on the fixing base. Therefore, the encoder can be assembled only by mounting the fixing base with the light receiving element plate and the fixed encoding plate on the flange.

In the above embodiment, the incremental type optical rotary encoder has been described, but the present invention can be applied to an absolute type optical rotary encoder.

Figure 4A:
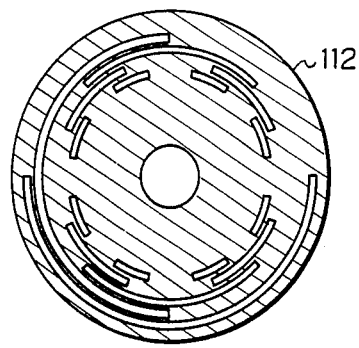
Figure 4B:
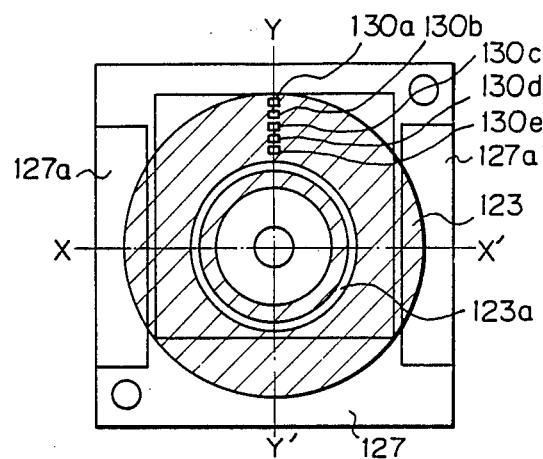
Figure 4C:
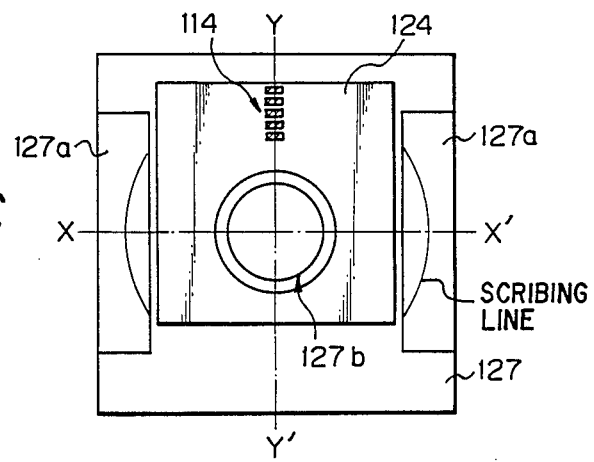

FIGS. 4(A) to 4(C) partially show an absolute type optical rotary encoder according to an embodiment of the present invention. FIG. 4(A) is a plan view of a rotating encoding disk 112, FIG. 4(B) is a plan view corresponding to FIG. 3(B), and FIG. 4(C) is a plan view corresponding to FIG. 3(C). In this embodiment, 5 annular slits are formed in the rotating encoding disk 112 as shown in FIG. 4(A), which enables absolute position detection of 5 binary bits, i.e., $2^5=0$ to 31 positions per rotation. Referring to FIG. 4(B), a light-transmitting ring 123a and pattern portions 130a to 130e for forming an absolute position code corresponding to the 5 annular slits of the rotating encoding plate 112 are formed in a fixed encoding plate 123 placed on a supporting portion 127a of a fixing base 127. Other portions of the plate 123 are covered with a black mask as indicaed by hatching. Referring to FIG. 4(C), a light receiving element array 114 corresponding to the pattern portions 130a to 130e of the fixed encoding plate 13 is arranged on a light receiving element plate 124, and is aligned precisely from the center of the rotating shaft in the radial direction just as in FIG. 3(C). The light receiving element plate 124 comprises a glass-epoxy plate having a hole engaged with a step 127b of a cylindrical portion of the fixing base 127 just as in FIG. 3(D).

As can be seen from the above description, the encoder shown in FIGS. 4(A) to 4(C) is substantially the same as the incremental type encoder shown in FIGS. 3(A) to 3(D) except for the annular slits of the rotating encoding plate 112, the pattern portions 130a to 130e of the fixed encoding plate 123, and the light receiving element array 114 of the light receiving element array 124. Therefore, it can be manufactured and assembled in the same manner as the above-mentioned incremental type encoder.

According to the present invention as described above, alignment becomes easy, and the number of assembling steps can be decreased.

CAPABILITY OF EXPLOITATION IN INDUSTRY

An optical rotary encoder of the present invention can be applied to precise positional detection of working machines.

I claim:

1. An optical rotary encoder for detecting a rotating position of a rotating shaft (11) by exposing and obscuring an optical path formed between a light emitting element (15) and an opposing light receiving element (14) upon rotation of the rotating shaft, comprising:

a fixing base (27) having a cylindrical portion concentric with an axis of said rotating shaft (11), and fixed to a flange (18);
a light receiving element plate (24) having a cylindrical hole of a size to be fittingly engaged with said cylinder of said fixing base (27) so as to be rotatable relative thereto during assembly, and a light receiving element mounted on said light receiving element plate and precisely aligned from the center of the hole in the radial direction thereof; and
a fixed encoding plate (23) in which an encoding portion is formed so that an emitted light is radiated on said light receiving element of said light receiving element plate (24), said fixed encoding plate being fixed to said fixing base so as to be adjacent to said light receiving element plate at a predetermined distance therefrom.

2. An optical rotary encoder according to claim 1, wherein said fixed encoding plate (23) is provided with a light-transmitting ring (23a) concentric with the axis of said rotating shaft.

3. A method for assembling an optical rotary encoder which detects a rotating position of a rotating shaft (11) by exposing and obscuring an optical path formed by a light emitting element (15) and an opposing light receiving element (14) upon rotation of the rotating shaft, wherein the encoder comprises: a fixing base (27) having a cylindrical portion concentric with an axial center of said rotating shaft, and fixed to a flange (18); a light receiving element plate (24) having a cylindrical hole of a size to be fittingly engaged with said cylinder of said fixing base so as to be rotatable relative thereto during assembly, and a light receiving element mounted on said light receiving element plate and precisely aligned from the center of the hole in the radial direction thereof; and a fixed encoding plate (23) in which an encoding portion is formed so that an emitted light is radiated on said light receiving element of said light receiving element plate and which is fixed to said fixing base so as to be adjacent to said light receiving element plate at a predetermined distance therefrom, said method comprising:

a. the step of fitting a cylinder step (27a) of said fixing base (27) in the hole of said light receiving element plate (24);
b. the step of aligning said fixed encoding plate (23) with a supporting portion (27a) of said fixing base (27);
c. the step of centering said fixed encoding plate (23);
d. the step of rotating said light receiving element plate (24) so as to align said light receiving element with said fixed encoding plate (23) while said light receiving element plate (24) is kept inserted on the cylindrical portion (27b) of said fixing base (27);
e. the step of fixing said light receiving element plate (24) and said fixed encoding plate (23) to said fixing base (27); and
f. the step of engaging said fixing base (27), said fixed encoding plate (23) and said light receiving element plate (24) which are aligned and fixed in the above steps, with an engaging portion of said flange (18).

* * * * *